(12) United States Patent
Liu et al.

(10) Patent No.: US 7,484,061 B1
(45) Date of Patent: Jan. 27, 2009

(54) METHOD FOR PERFORMING SWAP OPERATION AND APPARATUS FOR IMPLEMENTING THE SAME

(75) Inventors: Zhen Wu Liu, Sunnyvale, CA (US);
Shree Kant, Union City, CA (US);
Kenway W. Tam, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 453 days.

(21) Appl. No.: 11/100,976

(22) Filed: Apr. 6, 2005

(51) Int. Cl.
*G06F 12/02* (2006.01)
(52) U.S. Cl. ............... 711/165; 711/109; 711/110; 711/154; 710/22
(58) Field of Classification Search .............. None
See application file for complete search history.

(56) References Cited

U.S. PATENT DOCUMENTS 6,011,740 A * 1/2000 Trimberger ............ 365/221

6,069,839 A * 5/2000 Pancholy et al. ............ 365/233

* cited by examiner

*Primary Examiner*—Kevin L Ellis
*Assistant Examiner*—Alan M Otto
(74) *Attorney, Agent, or Firm*—Martine Penilla & Gencarella, LLP (57) ABSTRACT

A method and apparatus is provided to enable provision of requested data within two clock cycles when performing a swap operation between an accessible memory cell and a background memory in a computer. In a first clock cycle, memory addresses to be used in the swap operation are decoded. In a high phase of a second clock cycle, requested data is restored from the background memory to an accessible memory cell. Because the data previously stored in the accessible memory cell is duplicated in a shadow memory cell, the restoration of data to the accessible memory cell is performed without data loss. In a low phase of the second clock cycle, the requested data is available for reading. During a third cycle, data is saved from the shadow memory cell to the background memory, and the shadow memory cell is made consistent with the accessible memory cell.

20 Claims, 6 Drawing Sheets

METHOD FOR PERFORMING SWAP OPERATION AND APPARATUS FOR IMPLEMENTING THE SAME

BACKGROUND

Modern computer systems can employ a variety of memory structures for storing data and enabling retrieval of the stored data. Some memory structures are defined in a dual-level configuration, wherein a first level of memory serves as an interface to a larger second level of memory. In this type of memory structure, the second level of memory cannot be directly accessed by threads operating on the computer system. Therefore, data is written to and read from the memory through the first level. To service a data request, the memory performs a swap operation in which data stored in the first level is saved to the second level, then requested data in the second level is restored to the first level where it can be read. When servicing a data request by performing a swap operation, conventional memory structures require at least three clock cycles to enable reading of the requested data from the memory. It should be appreciated that performance of a thread requesting the data from the memory is directly impacted by how quickly the requested data can be provided by the memory. Consequently, it is advantageous from a thread performance perspective to provide the requested data item from memory in as few clock cycles as possible.

SUMMARY

It should be appreciated that the present invention can be implemented in numerous ways, such as a process, an apparatus, a system, a device or a method. Several inventive embodiments of the present invention are described below.

In one embodiment, a method is disclosed for performing a swap operation between an accessible memory cell and a background memory in a computer. The method includes a first operation for decoding a memory address of the accessible memory cell and a background memory cell to be used in the swap operation, wherein the background memory cell resides within the background memory. The method includes a second operation for restoring data from the background memory cell to the accessible memory cell, whereby previous data content of the accessible memory cell is overwritten. Once the data is restored to the accessible memory cell, the restored data is available for reading from the accessible memory cell. The method includes a third operation for saving the data content of the shadow memory cell to the background memory. In a fourth operation, data content of the accessible memory cell is saved to the shadow memory cell. The method requires the first through fourth operations to be performed in a sequential manner.

In another embodiment, a method for performing a swap operation in a computer memory is disclosed. The method includes an operation for decoding an address of an accessible memory cell and an address of a first background memory cell to be used in the swap operation. An operation is then performed to restore a first data item from the first background memory cell to the accessible memory cell. Once the first data item is restored to the accessible memory cell, reading of the first data item from the accessible memory cell is enabled. An operation is then performed to save a second data item from a shadow memory cell to a second background memory cell. Then, an operation is performed to save the first data item from the accessible memory cell to the shadow memory cell, thereby making the data content of the accessible memory cell and the shadow memory cell consistent.

In another embodiment, a memory is disclosed. The memory includes an accessible memory cell and a shadow memory cell that is uniquely associated with the accessible memory cell. The memory also includes a number of background memory cells uniquely associated with the accessible memory cell. A first data link is provided to enable data transmission from the accessible memory cell to the shadow memory cell. A second data link is provided to enable data transmission from the shadow memory cell to each of the number of background memory cells. Additionally, a third data link is provided to enable data transmission from each of the background memory cells to the accessible memory cell. The memory is configured to enable performance of a swap operation in which data is restored to the accessible memory cell prior to saving data previously stored in both the accessible memory cell and the shadow memory cell.

Other aspects of the invention will become apparent from the following detailed description, taken in conjunction with the accompanying drawings, illustrating by way of example the principles of the invention.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

It should be appreciated that the present invention can be implemented in numerous ways, including as a process, an apparatus, a system, a device, or a method. Several exemplary embodiments of the invention will now be described in detail with reference to the accompanying drawings.

Figure 1:
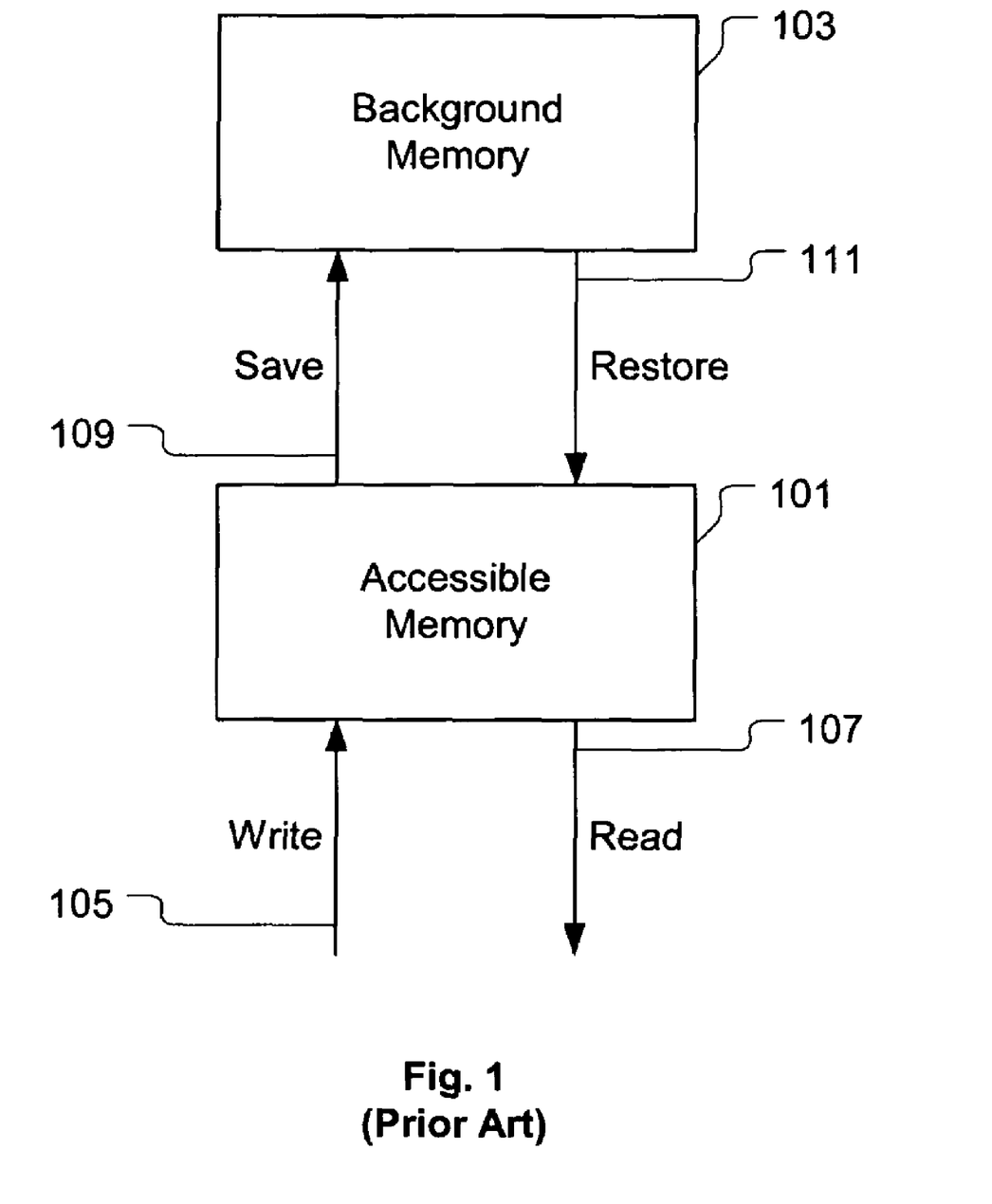
FIG. 1 is an illustration showing a memory configuration having an accessible memory and a background memory.

FIG. 1 is an illustration showing a memory configuration having an accessible memory 101 and a background memory 103. The accessible memory 101 can be directly accessed by an entity external to the memory configuration. However, the background memory 103 cannot be directly accessed by an entity external to the memory configuration. Thus, data can be written to the accessible memory 101 by the external entity, as indicated by arrow 105, but the data cannot be written directly to the background memory 103. Additionally, data can be read from the accessible memory 101 by the external entity, as indicated by arrow 107, but the data cannot be read directly from the background memory 103. Therefore, the accessible memory 101 serves as an interface to the background memory 103.

It should be appreciated that the background memory 103 is defined to store a plurality of data items at a given time, whereas the accessible memory 101 is defined to store a single data item at a given time. Therefore, each data item written to the accessible memory 101 should to be saved in the background memory 103, as indicated by arrow 109, to ensure persistence of the data item. Furthermore, because the background memory is not directly accessible by the external entity, it is necessary to restore a data item requested by the external entity from the background memory 103 to the accessible memory 101, as indicated by arrow 111, to enable reading of the data item from the accessible memory 101, as indicated by arrow 107.

The process of transferring a data item from the accessible memory 101 to the background memory 103, as indicated by arrow 109, is referred to as a "save" operation. The process of transferring a data item from the background memory 103 to the accessible memory 101, as indicated by arrow 111, is referred to as a "restore" operation. The "save" and "restore" operations are collectively referred to as a "swap" operation.

Figure 2:
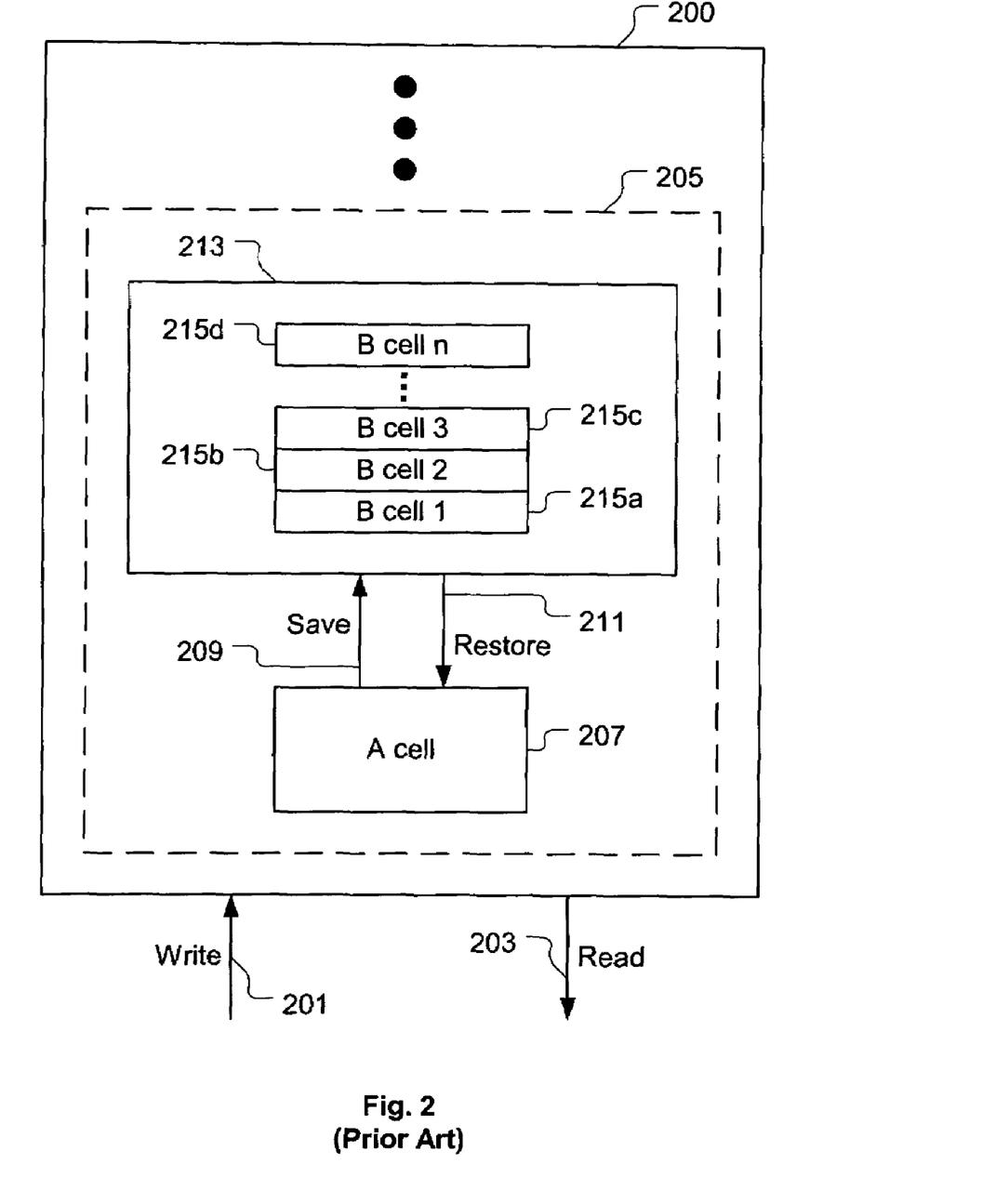
FIG. 2 is an illustration showing an example of a conventional embedded memory.

In one embodiment, the accessible memory 101 and the background memory 103 are defined as an embedded memory. FIG. 2 is an illustration showing an example of a conventional embedded memory 200. The embedded memory 200 is defined to include an array of memory structures 205. Each memory structure 205 includes a portion of the accessible memory 101 represented as an "A cell" 207, and a portion of the background memory 213. The portion of background memory 213 is defined to include a number of background memory cells represented as "B cell 1" 215a through "B cell n" 215d. The portion of background memory 213 and background memory cells 215a-215d defined therein are uniquely associated with the "A cell" 207. The unique association between the background memory cells 215a-215d and the "A cell" 207 effectively defines the boundaries of the corresponding memory structure 205.

It should be appreciated that the "A cell" 207 is capable of communicating in a bi-directional manner with each of the "B cells" 215a-215d of the corresponding memory structure 205. More specifically, data stored in the "A cell" 207 can be saved to either of the "B cells" 215a-215d, as indicated by arrow 209. Additionally, data stored in either of the "B cells" 215a-215d can be restored to the "A cell" 207, as indicated by arrow 211. The number of "B cells" 215a-215d associated with a given "A cell" 207 can vary in different embodiments. For example, in one exemplary embodiment, six "B cells" 215a-215d are associated with a single "A cell" 207.

The embedded memory 200 is defined to receive data to be written to the embedded memory 200, as indicated by arrow 201. Also, the embedded memory 200 is defined to provide data to be read from the embedded memory 200, as indicated by arrow 203. During operation, the "A cell" 207 of each memory structure 205 serves as an interface for writing data to the embedded memory 200 and reading data from the embedded memory 200. It should be appreciated that access to each of the "B cells" 215a-215d of each memory structure 205 is facilitated by the corresponding "A cell" 207. For example, if data stored in a particular "B cell" 215c needs to be read out of the embedded memory 200, the data currently stored in the "A cell" 207 is saved to an appropriate "B cell" other than "B cell" 215c, then the data stored in "B cell" 215c is restored to the "A cell" 207 from which it can be read out of the embedded memory 200. The operations of saving data in the "A cell" to an appropriate "B cell", and restoring requested data from a particular "B cell" to the "A cell" 207, collectively define a swap operation. It should be appreciated that during the swap operation, different "B cell" addresses are used for the save and restore operations.

Figure 3A:
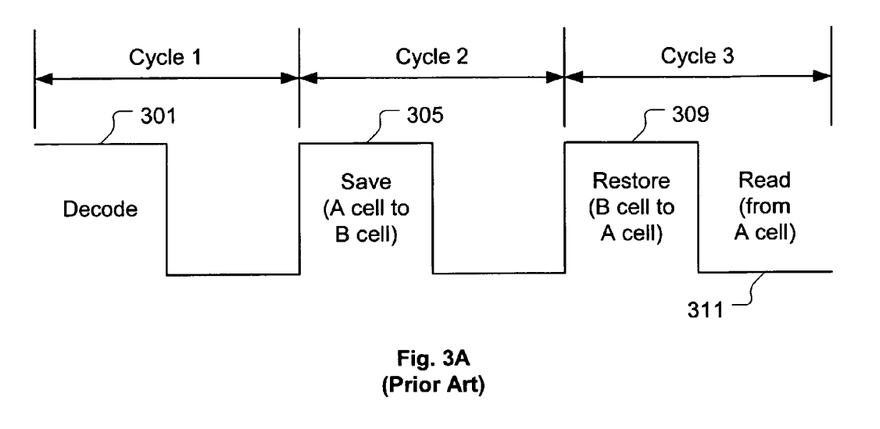
FIG. 3A is an illustration showing a clock cycle sequence required to read data from the "A cell" in accordance with a conventional swap operation performed using the conventional embedded memory.

The conventional embedded memory 200 requires three clock cycles to enable reading of a requested data item. FIG. 3A is an illustration showing a clock cycle sequence required to read data from the "A cell" 207 in accordance with a conventional swap operation performed using the conventional embedded memory 200. During a high phase of a first clock cycle 301, memory addresses for the appropriate "A cell" 207 and "B cell" 215a-215d are decoded. For discussion purposes, the "A cell" and "B cell" corresponding to the decoded memory addresses will be referred to as the "decoded A cell" and the "decoded B cell", respectively. During a high phase of a second clock cycle 305, the data item stored in the "decoded A cell" is saved to an associated "B cell" having a memory address different from the "decoded B cell." During a high phase of a third clock cycle 309, the data item stored in the "decoded B cell" is restored to the "decoded A cell." Then, in a low phase of the third clock cycle 311, the data item restored to the "decoded A cell" can be read from the "decoded A cell."

Figure 3B:
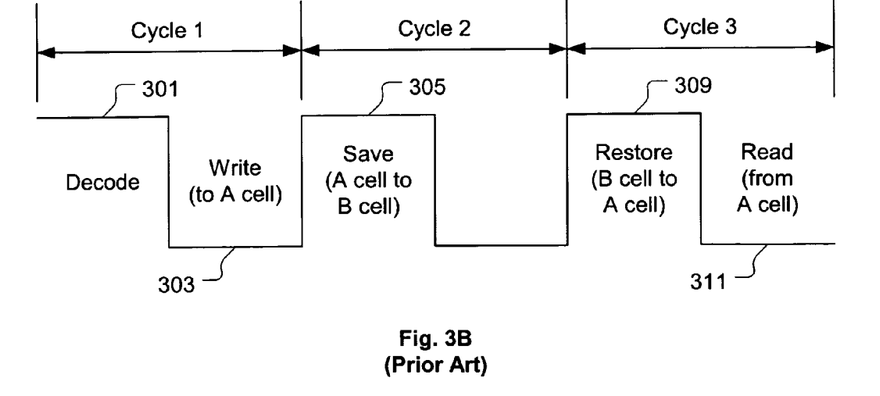
FIG. 3B is an illustration showing a clock cycle sequence for performing a conventional swap operation immediately following a write operation using the conventional embedded memory.

It should be appreciated that the conventional swap operation of FIG. 3A implies that data has already been written to the "decoded A cell." FIG. 3B is an illustration showing a clock cycle sequence for performing a conventional swap operation immediately following a write operation using the conventional embedded memory 200. It should be appreciated that the operations depicted in FIG. 3B are identical to the operations depicted in FIG. 3A with respect to the high phase of the first clock cycle 301, the high phase of the second clock cycle 305, the high phase of the third clock cycle 309, and the low phase of the third clock cycle 311. The difference between FIGS. 3B and 3A is that a data item is written to the "decoded A cell" in accordance with the low phase of the first clock cycle. Therefore, in the high phase of the second clock cycle 305, the data item saved to the associated "B cell" is actually the data item that was just written to the "decoded A cell" in the previous clock cycle.

Based on the discussion above, it can be seen that at least three clock cycles are required to read a requested data item from the conventional embedded memory 200. Thus, a thread requesting the data item is required to wait three clock cycles to complete a read of the data item from the conventional embedded memory 200. It should be appreciated that performance of the thread requesting the data item from the memory is directly impacted by how quickly the requested data item can be read from the memory. Consequently, it would be beneficial from a thread performance perspective to enable provision of a requested data item from memory in less than three clock cycles. To this end, the present invention provides an enhanced embedded memory and corresponding method of operation that enables a requested data item to be read from the enhanced embedded memory in two clock cycles, rather than three clock cycles.

Figure 4:
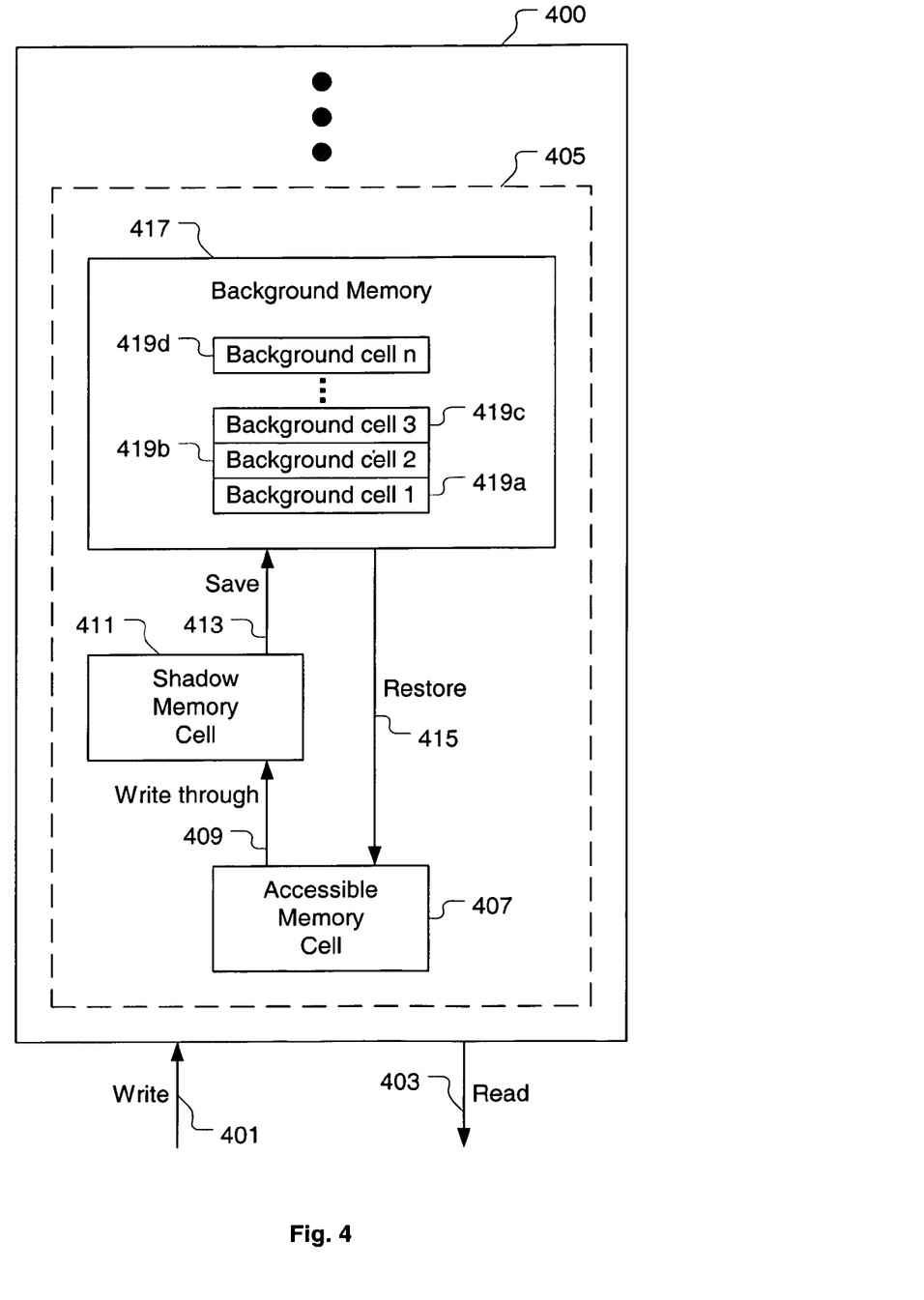
FIG. 4 is an illustration showing an enhanced embedded memory, in accordance with one embodiment of the present invention.

FIG. 4 is an illustration showing an enhanced embedded memory 400, in accordance with one embodiment of the present invention. The enhanced embedded memory 400 is defined to include an array of memory structures 405. Each memory structure 405 includes an accessible memory cell 407, a shadow memory cell 411, and a background memory 417. The background memory includes a number of background memory cells 419a-419d. The shadow memory cell 411 and each background memory cell 419a-419d in the background memory 417 are uniquely associated with the accessible memory cell 407. The unique association between the shadow memory cell 411, the background memory cells 419a-419d, and the accessible memory cell 407 effectively defines the boundaries of the corresponding memory structure 405.

A data link 409 is defined to provide for communication of data from the accessible memory cell 407 to the shadow memory cell 411. A data link 413 is defined to provide for communication of data from the shadow memory cell 411 to the background memory 417. It should be appreciated that the data link 413 is defined to provide for communication of data from the shadow memory cell 411 to either of the background memory cells 419a-419d, as appropriate for the particular data transfer process being performed. A data link 415 is defined to provide for communication of data from the background memory cells 419a-419d to the accessible memory cell 407.

The enhanced embedded memory 400 is defined to receive data to be written to the enhanced embedded memory 400, as indicated by arrow 401. Also, the enhanced embedded memory 400 is defined to provide data to be read from the enhanced embedded memory 400, as indicated by arrow 403. During operation, the accessible memory cell 407 serves as the interface for writing data to the enhanced embedded memory 400 and reading data from the enhanced embedded memory 400. When a data item is written to the enhanced embedded memory 400, the data item is both written to the accessible memory cell 407 and written through the accessible memory cell 407 to the shadow memory cell 411, via the data link 409. Thus, when the data item is written to the enhanced embedded memory 400, the data item is stored in both the accessible memory cell 407 and the shadow memory cell 411. When a data item is to be saved in the background memory 417, the data item is transferred to an appropriate background memory cell (one of 419a-419d) from the shadow memory cell 411, via the data link 413. When a data item stored in the background memory 417 is requested by and external entity, the data item is restored from the appropriate background memory cell (one of 419a-419d) to the accessible memory cell 407, via the data link 415. The requested data item can then be read from the accessible memory cell 407 by the external entity.

The operations of saving a data item stored in both the accessible memory cell 407 and shadow memory cell 411 to an appropriate background memory cell 419a-419d, and restoring a requested data from a particular background memory cell 419a-419d to the accessible memory cell 407, collectively define a swap operation. During the swap operation, different background memory cell addresses are used for the save and restore operations. The structure of the enhanced embedded memory 400 allows the swap operation to be performed in a manner that enables reading of the requested data item from the accessible memory cell 207 within two clock cycles, as opposed to within three clock cycles as required by the conventional embedded memory 200.

Figure 5A:
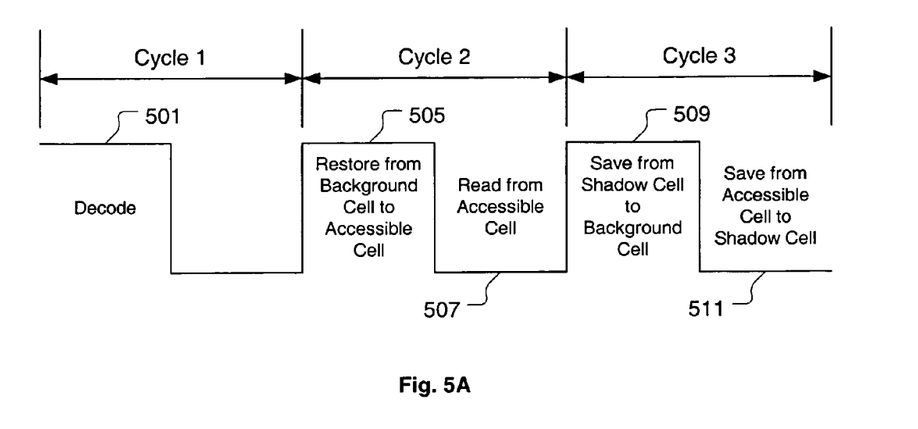
FIG. 5A is an illustration showing a clock cycle sequence for performing a swap operation using the enhanced embedded memory, in accordance with one embodiment of the present invention.

FIG. 5A is an illustration showing a clock cycle sequence for performing a swap operation using the enhanced embedded memory 400, in accordance with one embodiment of the present invention. During a high phase of a first clock cycle 501, memory addresses are decoded for the accessible memory cell 407 and the associated background memory cell (one of 419a-419d) that includes the requested data item to be read. For discussion purposes, the background memory cell including the requested data item to be read is referred to as the "read background cell", hereafter. It should be understood that prior to performing the swap operation, the same data is stored in both the accessible memory cell 407 and the shadow memory cell 411.

During a high phase of the second clock cycle 505, the requested data item stored in the read background cell is restored to the accessible memory cell 407, such that data previously stored in the accessible memory cell 407 is overwritten by the requested data item. During a low phase of the second clock cycle 507, the requested data item stored in the accessible memory cell 407 is available for reading out of the enhanced embedded memory 400. During a high phase of a third clock cycle 509, the data item stored in the shadow cell 411 is saved to an appropriate background memory cell, i.e., one of the background memory cells 419a-419d other than the read background cell. During a low phase of the third clock cycle 511, the data stored in the accessible memory cell 407 is saved to the shadow cell 411, thereby making the data stored in the shadow memory cell 411 consistent with the data stored in the accessible memory cell 407. It should be appreciated that the save operation performed during the low phase of the third cycle 511 ensures that the same data is stored in both the accessible memory cell 407 and the shadow memory cell 411 prior to performing a subsequent swap operation.

With respect to the above discussion of FIG. 5A, it should be recognized that the requested data item is made available for reading out of the enhanced embedded memory 400 in two clock cycles, i.e., in the low phase of the second clock cycle 507. Although the swap operation requires three clock cycles to fully complete, an operating thread is provided with a requested data item within two clock cycles. Thus, during the third clock cycle when the swap operation is completing, operation of the thread having requested and received the data item in the second clock cycle is allowed to proceed. Therefore, the enhanced embedded memory 400 and method for performing a swap operation therewith enables faster service of data requests, as compared to the conventional embedded memory 200.

Figure 5B:
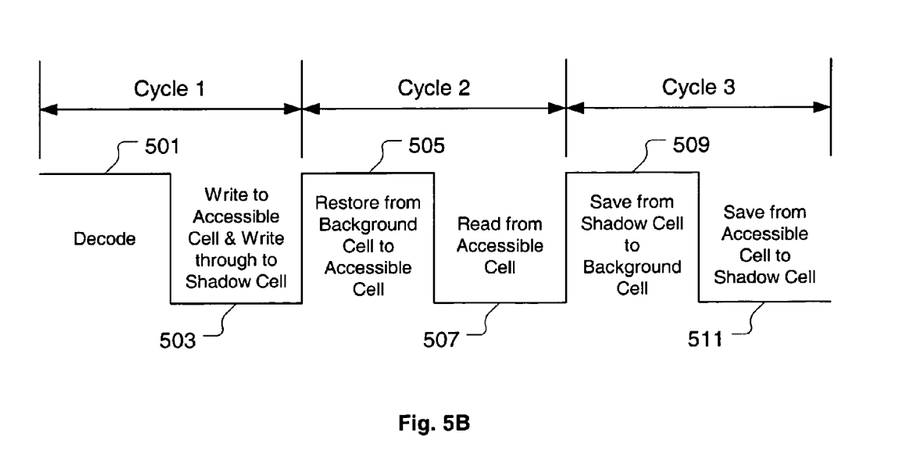
FIG. 5B is an illustration showing a clock cycle sequence for performing sequential write and swap operations using the enhanced embedded memory, in accordance with one embodiment of the present invention.

FIG. 5B is an illustration showing a clock cycle sequence for performing sequential write and swap operations using the enhanced embedded memory 400, in accordance with one embodiment of the present invention. It should be appreciated that the operations depicted in FIG. 5B are identical to the operations depicted in FIG. 5A with respect to the high phase of the first clock cycle 501, the high and low phases of the second clock cycle 505 and 507, and the high and low phases of the third clock cycle 509 and 511.

During a low phase of the first clock cycle 503, a data item is written to the accessible memory cell 407. At the same time the data item is written to the accessible memory cell 407, the data item is written through the accessible memory cell 407 to the shadow memory cell 411. Thus, following the writing operations in the low phase of the first clock cycle 503, the same data is stored in both the accessible memory cell 407 and the shadow memory cell 411. The swap operation as previously discussed with respect to the second and third cycles of FIG. 5A are also conducted in the second and third cycles, respectively, of FIG. 5B. Thus, although the sequential write and swap operations require three clock cycles to fully complete, it should be appreciated that the requested data item is made available for reading out of the enhanced embedded memory 400 in two clock cycles, i.e., in the low phase of the second clock cycle 507.

Figure 6:
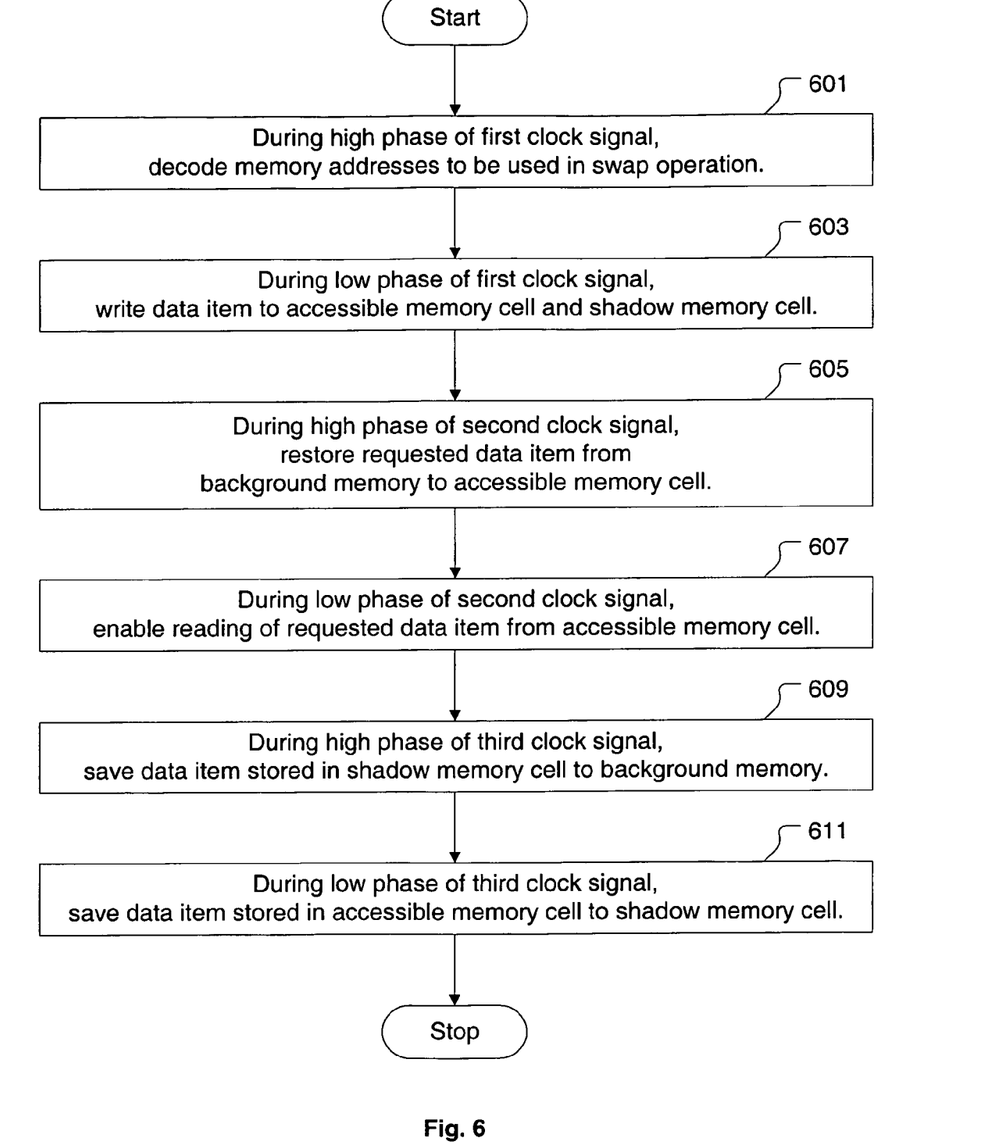
FIG. 6 is an illustration showing a flowchart of a method for performing a swap operation using the enhanced embedded memory, in accordance with one embodiment of the present invention.

FIG. 6 is an illustration showing a flowchart of a method for performing a swap operation using the enhanced embedded memory 400, in accordance with one embodiment of the present invention. An operation 601 is performed in accordance with a high phase of a first clock cycle. In the operation 601, memory addresses to be used in the swap operation are decoded. More specifically, memory addresses of an accessible memory cell and an associated background memory cell are decoded. The associated background memory cell stores a data item to be read from the enhanced embedded memory 400 during the swap operation.

In one embodiment, an operation 603 is performed in accordance with a low phase of the first clock cycle. In the operation 603, a data item is written from outside the enhanced embedded memory 400 to both the accessible memory cell and an associated shadow memory cell. More specifically, the data item is written through the accessible memory cell to the shadow memory cell, such that data item is stored in both the accessible memory cell and the shadow memory cell following the low phase of the first clock cycle. It should be understood, however, that the operation 603 is performed when a sequential write and swap operation is being conducted. In another embodiment wherein the swap operation is performed without a preceding write operation, the operation 603 is not performed.

The method continues with an operation 605 that is performed in accordance with a high phase of a second clock cycle. During the operation 605, the data item to be read from the enhanced embedded memory 400 is restored from the associated background memory cell to the accessible memory cell. An operation 607 is then performed in accordance with a low phase of the second clock cycle. In the operation 607, reading of the data item restored to the accessible memory cell in the operation 605 is enabled. Thus, in the operation 607, an entity external to the enhanced embedded memory 400 can read the requested data item from the accessible memory cell.

The method continues with an operation 609 that is performed in accordance with a high phase of a third clock cycle. In the operation 609, the data item stored in the shadow memory cell is saved to the background memory. An operation 611 is then performed in accordance with a low phase of the third clock cycle. In the operation 611, the data item currently stored in the accessible memory cell is saved to the shadow memory cell. Thus, following the operation 611, the same data item is stored in each of the accessible memory cell and the shadow memory cell.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

Embodiments of the present invention can be processed on a single computer, or using multiple computers or computer components which are interconnected. A computer, as used herein, shall include a standalone computer system having its own processor, its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for performing a swap operation between an accessible memory cell and a background memory in an embedded memory of a computer, comprising:
   (a) decoding a memory address of the accessible memory cell and a background memory cell to be used in the swap operation, wherein the background memory cell resides within the background memory;
   (b) restoring data from the background memory cell to the accessible memory cell, whereby previous data content of the accessible memory cell is overwritten, wherein the data restored to the accessible memory cell is available for reading from the embedded memory following the restoring;
   (c) saving data content of a shadow memory cell to the background memory; and
   (d) saving data content of the accessible memory cell to the shadow memory cell such that the accessible memory cell and shadow memory cell store a same data content,
   wherein operations (a)-(d) are performed in a sequential manner, and
   wherein the accessible memory cell, the background memory, and the shadow memory cell are defined within an embedded memory, and wherein the accessible memory cell is directly accessible from outside the embedded memory by a number of threads operating on the computer such that data can be written to and read from the accessible memory cell by the number of threads operating on the computer, and wherein each of the background memory and the shadow memory cell is not directly accessible by the number of threads operating on the computer.

2. The method of claim 1, further comprising:
   writing data content to the accessible memory cell and the shadow memory cell following the operation (a) and prior to the operation (b).

3. The method of claim 2, wherein writing the data content to the shadow memory cell is performed by writing the data content through the accessible memory cell to the shadow memory cell.

4. The method of claim 2, wherein the operation (a) is performed in accordance with a high phase of a first clock signal and writing data content to the accessible memory cell and the shadow memory cell is performed in accordance with a low phase of the first clock signal.

5. The method of claim 1, wherein operation (a) is performed in accordance with a first clock signal, operation (b) is performed in accordance with a second clock signal, and operations (c) and (d) are performed in accordance with a third clock signal.

6. The method of claim 5, wherein operation (b) is performed in accordance with a high phase of the second clock signal and the data restored from the background memory to the accessible memory cell in operation (b) is available for reading from the accessible memory cell in accordance with a low phase of the second clock signal.

7. The method of claim 5, wherein operation (c) is performed in accordance with a high phase of the third clock signal and operation (d) is performed in accordance with a low phase of the third clock signal.

8. The method of claim 1, wherein the background memory and shadow memory cell are uniquely associated with the accessible memory cell.

9. The method of claim 1, wherein the background memory includes a number of background memory cells, the operations (b) and (c) being performed in conjunction with different background memory cells.

10. A method for performing a swap operation in a computer memory, comprising:
  decoding an address of an accessible memory cell and an address of a first background memory cell to be used in the swap operation, wherein the accessible memory cell and the background memory cell are defined in an embedded memory;
  restoring a first data item from the first background memory cell to the accessible memory cell;
  enabling reading of the first data item from the accessible memory cell by a thread operating outside of the embedded memory;
  saving a second data item from a shadow memory cell to a second background memory cell, wherein the shadow memory cell is also defined in the embedded memory; and
  saving the first data item from the accessible memory cell to the shadow memory cell, such that the accessible memory cell and the shadow memory cell store a same data content.

11. The method of claim 10, wherein the shadow memory cell, the first background memory cell, and the second background memory cell are each uniquely associated with the accessible memory cell.

12. The method of claim 10, further comprising:
  writing the second data item to the accessible memory cell and the shadow memory cell after the decoding and prior to the restoring.

13. The method of claim 12, wherein the second data item is written through the accessible memory cell to the shadow memory cell.

14. The method of claim 12, wherein writing the second data item to the accessible memory cell and reading the first data item from the accessible memory cell are performed by an external entity that is allowed to interface with the accessible memory cell but not with either the shadow memory cell, the first background memory cell, or the second background memory cell.

15. The method of claim 10, wherein decoding the address of the accessible memory cell and the address of the first background memory cell is performed in accordance with a first clock signal,
  wherein restoring the first data item from the background memory cell to the accessible memory cell is performed in accordance with high phase of a second clock signal, and
  wherein enabling reading of the first data item from the accessible memory cell is performed in accordance with a low phase of the second clock signal.

16. The method of claim 15, wherein saving the second data item from the shadow memory cell to the second background memory cell is performed in accordance with a high phase of a third clock signal, and
  wherein saving the first data item from the accessible memory cell to the shadow memory cell is performed in accordance with a low phase of the third clock signal.

17. An embedded memory of a computer, comprising: an accessible memory cell directly accessible by an entity external to the embedded memory; a shadow memory cell uniquely associated with the accessible memory cell, wherein the shadow memory cell is not directly accessible by an entity external to the embedded memory; a number of background memory cells uniquely associated with the accessible memory cell, wherein each of the number of background memory cells is not directly accessible by an entity external to the embedded memory; a first data link to enable data transmission from the accessible memory cell to the shadow memory cell; a second data link to enable data transmission from the shadow memory cell to each of the number of background memory cells; and a third data link to enable data transmission from each of the background memory cells to the accessible memory cell, wherein the embedded memory is configured to enable performance of a swap operation between an accessible memory cell and a background memory cell in which data is restored to the accessible memory cell from the background memory cell prior to saving data that was previously present at a same time in both the accessible memory cell and the shadow memory cell.

18. An embedded memory of claim 17, wherein the accessible memory cell and the shadow memory cell are defined such that data written to the accessible memory cell from outside the embedded memory is written through the accessible memory cell to the shadow memory cell.

19. An embedded memory of claim 17, further comprising:
  a clock circuit having connections to each of the accessible memory cell, the shadow memory cell, and the number of background memory cells,
  wherein the clock circuit is defined to direct decoding of a memory address of the accessible memory cell in accordance with a first clock cycle,
  wherein the clock circuit is defined to direct a restoration of a first data item from a particular one of the number of background memory cells to the accessible memory cell in accordance with a high phase of a second clock cycle, and
  wherein the clock circuit is defined to enable a reading of the first data item from the accessible memory cell in accordance with a low phase of the second clock cycle.

20. An embedded memory of claim 19, wherein the clock circuit is defined to direct a saving of a second data item from the shadow memory cell to one of the number of background memory cells in accordance with a high phase of a third clock signal, and
  wherein the clock circuit is defined to direct a saving of the first data item from the accessible memory cell to the shadow memory cell in accordance with a low phase of the third clock signal.

* * * * *